Figures 1, 2:
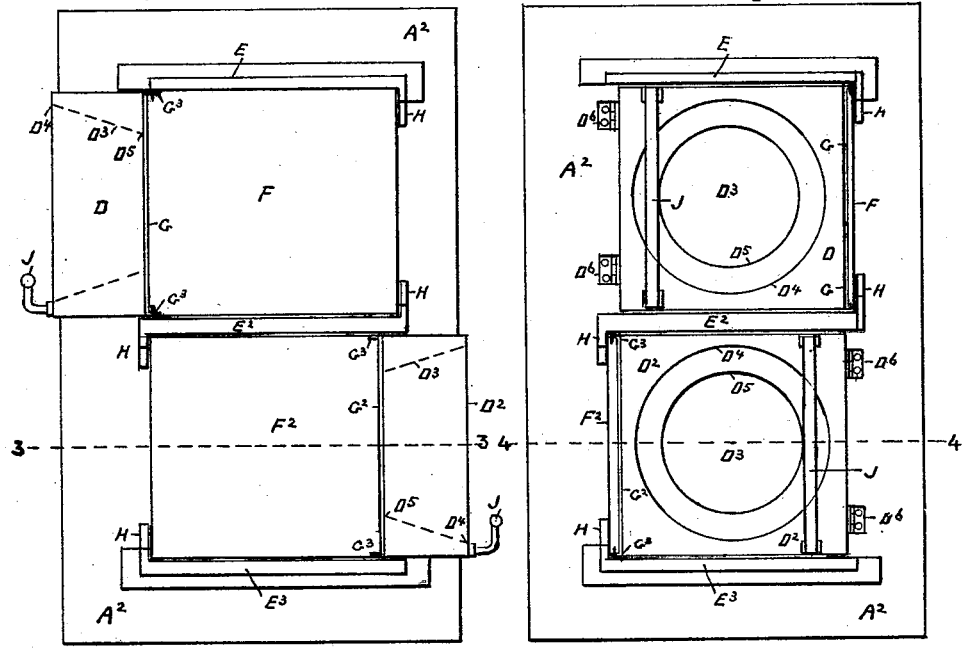

(No Model.) 2 Sheets—Sheet 1.

J. E. CURRY.
DUMPING APPARATUS.

No. 425,596. Patented Apr. 15, 1890.

WITNESSES.
Henry F. McKeever
Geo. C. Dust

INVENTOR.
John E. Curry
by his Attorneys
Brown Bros.

(No Model.) 2 Sheets—Sheet 2.
J. E. CURRY.
DUMPING APPARATUS.
No. 425,596. Patented Apr. 15, 1890.
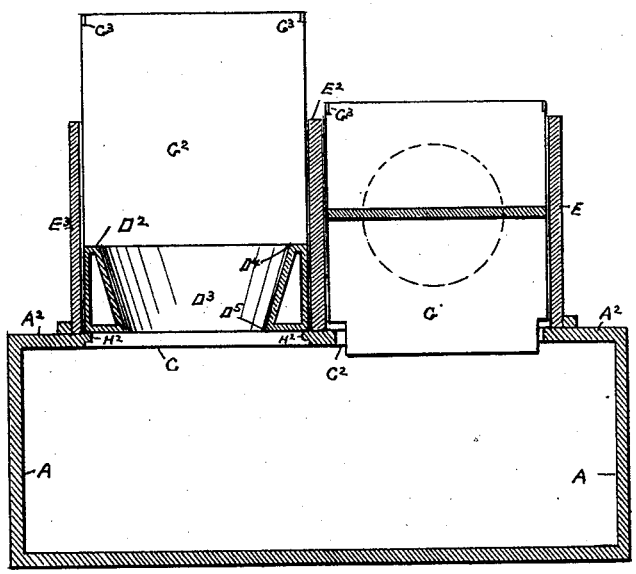
Fig. 5.
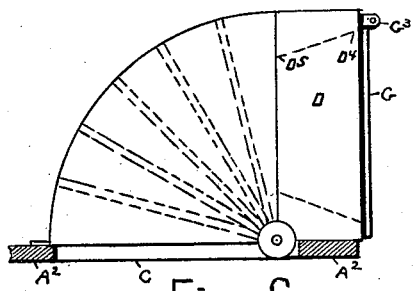
Fig. 6.
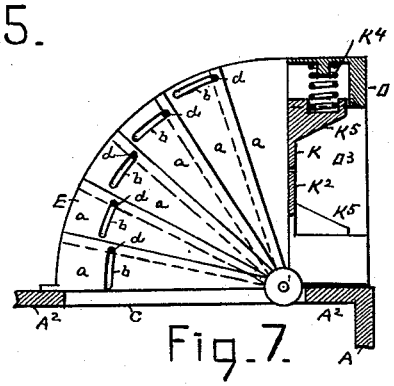
Fig. 7.
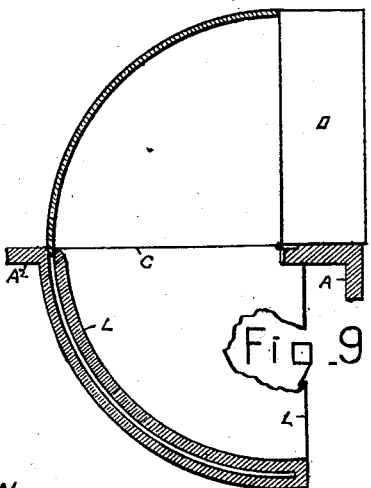
Fig. 9.
Fig. 8.
WITNESSES.
W. O. Shaw
Henry F. McKeaver.
INVENTOR.
John E. Curry
by his Attorneys
Brown Bros.

UNITED STATES PATENT OFFICE.

JOHN E. CURRY, OF BOSTON, MASSACHUSETTS, ASSIGNOR OF ONE-HALF TO MARY E. HAYES, OF SAME PLACE.

DUMPING APPARATUS.

SPECIFICATION forming part of Letters Patent No. 425,596, dated April 15, 1890.

Application filed April 29, 1889. Serial No. 309,064. (No model.)

*To all whom it may concern:*

Be it known that I, JOHN E. CURRY, a citizen of the United States of America, and a resident of the city of Boston, in the county of Suffolk and State of Massachusetts, have invented certain new and useful Improvements in Apparatus for Dumping Contents of Vessels, of which the following is a full, clear, and exact description.
This invention relates to an apparatus more especially designed as an attachment to wagons, carts, or other vehicles employed in cities, towns, villages, &c., for gathering or collecting garbage, offal, swill, ashes, or refuse, &c., of all kinds, to the end that the matters can be dumped intact from the barrel or other receptacle in which found or from which to be dumped into a receptacle for transportation or other purpose, or, in other words, that there shall be no practical or substantial escape of the matters or of effluvia from them as they are dumped from the one receptacle into the other; but, however, as will appear from the description hereinafter given, the apparatus of this invention is otherwise usefully and practically applicable, and therefore the invention is not to be limited in that relation.

In substance the apparatus of this invention is composed of a hopper or chute suitable to receive a barrel, &c., containing the matters to be dumped, which is held on a suitable support having an opening, throat, or conduit for being moved from a position at one side of to a position over said opening or throat, and vice versa, and as so moved presented in planes at right angles or thereabout to each other, in combination with a hood arranged as to said opening or throat and said hopper to cover and close the former on all sides and at all points not covered by the hopper and in both positions of the hopper, and also as the hopper is moved from one to the other position, as stated, whereby any and all practical and substantial escape of or effluvia from the matters being dumped through said hopper and into said opening or throat is avoided.

Further than the above the apparatus of this invention, and which constitutes a specific feature thereof, is composed of a hopper or chute suitable to receive the barrel, &c., containing the matters to be dumped, which is held on a suitable support having an opening, throat, or conduit for being moved from a position at one side of to a position over said opening or throat, or vice versa, and as so moved presented in planes at right angles or thereabout to each other, in combination with a hood composed of stationary sides and a movable back, severally arranged as to each other and as to said opening or throat and said hopper as to cover the opening or throat on all sides and at all points not covered by the hopper, and in both positions of the hopper and also as the hopper is moved from one to the other position, whereby any and all practical and substantial escape of or effluvia from the matters being dumped through said hopper and into said opening or throat is avoided.

In addition to the above the apparatus of this invention comprises a lid to close the passage or way of the hopper or chute when the chute is in its normal position and arranged to open and close it automatically and as the hopper is moved from one to the other of its positions, as above described.

In the drawings, forming part of this specification, the apparatus of this invention is illustrated under different constructions and arrangements of the hood and of the opening and closing cover for the passage or way of the hopper, and Figs. 1 to 5, both inclusive, illustrate the invention in the construction and arrangement of hood constituting the specific feature of this invention, and which is most preferable and practical for use.

Figure 3:
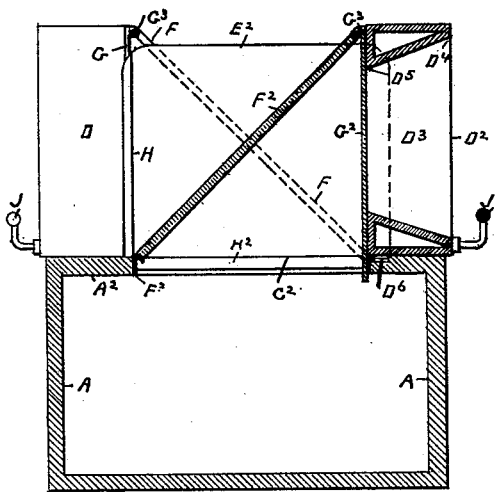
Figure 4:
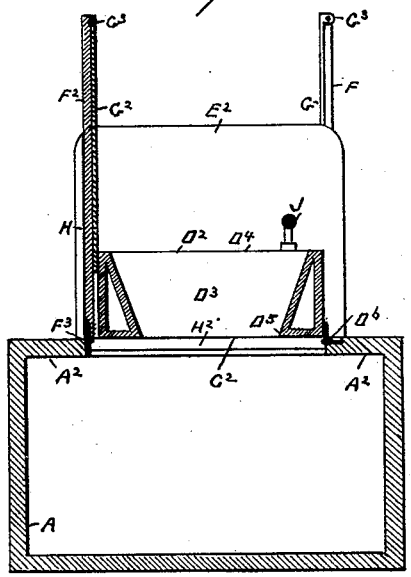

Figure 1 is a plan view of the apparatus in duplicate, and each in normal position and attached to a receptacle common to both and arranged to be operated from opposite sides of the receptacle. Fig. 2 is a similar view to Fig. 1, but showing each apparatus as having its hopper or chute moved from its normal to a position at right angles or thereabout to its normal position, and the back of the hood as in position to accommodate the chute as so placed. Figs. 3 and 4 are transverse vertical sections, lines 3 3 and 4 4, respectively, Figs. 1 and 2. Fig. 5 is a central longitudinal vertical section with one hopper in its normal position and the other hopper moved to a position at right angles or thereabout to its normal position. Figs. 6, 7, 8, and 9 are views in illustration of the hood, more particularly and in various forms of its construction and otherwise, all as hereinafter particularly described.

In the drawings, A is a receptacle suitable for containing garbage, offal, swill, ashes, &c., closed on all its several sides, and at its top $A^2$ having two openings or throats C $C^2$, through which to enter offal, &c., into it. The receptacle A may be of any construction desired suitable for containing the matter which it is desired to hold—as, for illustration, it may be the body of a wagon, cart, or other vehicle, and it may be otherwise of any form and arrangement in detail and in general which may be thought necessary, and also it may be arranged to be stationary or movable.

For the purposes of this invention a construction of the receptacle A other than it should be capable of receiving or containing the matters which it is to hold is neither essential for the use and working of the apparatus of this invention, nor is this invention in any way to be limited thereto.

The receptacle A as particularly shown is a simple box of rectangular shape, having openings or throats C $C^2$, and otherwise closed, all as stated, and the top, as also all other portions, are shown as immovable; but either one or more may be movable or attachable or detachable at pleasure, as may be desired or deemed best.

In Figs. 1 to 5, both inclusive, D $D^2$ are two chutes or hoppers, each composed of a rectangular-shaped frame having an open tapering passage or way $D^3$ leading through it from one side $D^4$ to the other side $D^5$. Each chute or hopper at one side is held on the top $A^2$ of the receptacle by butt-hinges $D^6$, and is located at one side of a throat C $C^2$ of the top and otherwise so that each chute in a vertical position is at rest on the top and beyond the throat C of the receptacle, and has its passage or way $D^3$ presented, its smaller—which is its delivery end $D^4$—toward the throat, and its larger—which is its receiving end $D^5$—toward that side of the receptacle contiguous to the side of the throat at which the chute is hinged, as stated. Each chute or hopper swinging on its hinges $D^6$ from a vertical to a horizontal position lies over its throat C or $C^2$ of the receptacle top, and in this position the passage or way $D^3$ of the chute is in line with said throat. The two chutes or hoppers arranged as just particularly explained and each in its vertical or normal position present the larger ends $D^4$ of their tapering ways or passages $D^3$ toward the opposite sides of the receptacle.

E $E^2$ $E^3$ are vertical stationary wings of the receptacle top and located at and alongside of the throats C $C^2$ of said top, and severally parallel to each other and to the vertical plane of swing of the hoppers or chutes, and all so that the hoppers or chutes in swinging will pass between them, extending the one hopper D between the wings E $E^2$ and the other hopper $D^2$ between the wings $E^2 E^3$. The wings E $E^2$ $E^3$ serve as guards or fenders at the sides of the throats C $C^2$ of the receptacle to the escape of and of effluvia from the contents of the receptacle, and also to the escape of the matters as they are passed through the way or passage of the chutes or hoppers and dumped into the receptacle.

F $F^2$ are two vertical lids standing between the wings E $E^2$ and $E^2$ $E^3$, respectively. Each lid F $F^2$ at its lower end portion is held by butt-hinges $F^3$ $F^3$ on the receptacle top and at the side of the throats C $C^2$ of the receptacle top opposite to that of each at which the chutes or hoppers are hinged, as before described. Again, each lid F $F^2$ in the vertical or normal position of the hoppers or chutes inclines and lies across the throat C $C^2$ of the receptacle top to which it is applied, and at its upper end portion rests against the hopper above the smaller or delivery end $D^5$ of its way or passage $D^3$, and in the co-operation of them with the stationary side wings E $E^2$ $E^3$ of suitable height therefor the throats C $C^2$ of the receptacle top are thereby closed, except as to the communication with them, if not otherwise provided for, through the passages or ways $D^3$ of the chutes or hoppers.

G $G^2$ are lids or covers, each attached by pivoted ear-pieces $G^3$ at its upper end portion to the upper end portion of and located between a lid F $F^2$ and the chute or hopper in conjunction with which the lid F $F^2$ is arranged, as has been described. Each cover G $G^2$ is of suitable size to cover the passage or way $D^3$ of the chute D $D^2$, to the lid of which it is pivoted, as stated, and in its normal position, as also the normal position of the chute to which it belongs, it stands across and closes the delivery end $D^5$ of the passage or way $D^3$ of the chute, and thus with the side wings E $E^2$ $E^3$ and hinged lids F $F^2$ the throats C $C^2$ in the receptacle top are completely closed, they being otherwise closed, as has been explained.

In swinging a chute or hopper D $D^2$ from a vertical to a horizontal position both lids F or $F^2$ and G or $G^2$ belonging to it, as described, are moved along with it and together brought into a vertical position at the side of the receptacle-throat at which the lid F or $F^2$ is hinged, as stated, and the lid F or $F^2$ to a rest and confined against vertical projecting flanges H H of the wings E $E^2$ $E^3$, suitably located therefor, and the chutes at a rest $H^2$ upon the receptacle top and at opposite sides of their throats and inside of the wings E $E^2$ $E^3$. (See Fig. 5.) In swinging the chutes or hoppers D $D^2$ from a horizontal position to a vertical position their lids G $G^2$ from their own gravity follow the chutes, and with the chutes in a vertical position they are then at rest on them, closing their passages or ways $D^3$, and in co-operation with the side wings E E² E³ and the lids F F² also the throats C C² in the top of the receptacle are closed.

In the practical use of the apparatus described for the gathering of swill, ashes, &c., the barrel, &c., containing the matters is first entered into the passage or way of a chute or hopper then in a vertical position, and being closely seated therein it is tipped up so as to swing the chute down into a horizontal position, and thereby its contents are dumped into the receptacle, when the barrel is pulled backward, carrying the chute or hopper with it and bringing it again to a vertical position, when the barrel is removed and the apparatus is ready for the dumping of another barrel as before, and so on.

In each operation of apparatus, as described, obviously all escape of the matters being dumped or of effluvia from them or otherwise from the contents of the receptacle is practically and substantially avoided, as is obvious without further explanation.

A tapering way or passage $D^3$ through the chutes or hoppers adapts the chute to the dumping of barrels of varying perimeter within given limits, at the same time securing a tight or close fit of the opened and entered end of the barrel within the way or passage.

Preferably each chute has a rail J, supported at its opposite ends or otherwise suitably on the chute, for resting the barrel upon as it is entered into the chute and otherwise, as stated, and also serving as a fulcrum to the barrel as a lever, as it were, in raising the chute from a horizontal to a vertical position after it is dumped.

In Fig. 6 the lid G for closing the way or passage $D^3$ of each chute or hopper D D² may be arranged and hinged at the receiving end $D^4$ of the chute or hopper in lieu of at its discharging or delivery end $D^5$, as has been described, and shown in the preceding figures, to be displaced by the hands or otherwise, or the lid may be similarly directly hinged on the chute or hopper at the delivery end of its way or passage, to open outward therefrom as the chute is swung to dump a barrel, as described, and as the chute returns to its normal position to close by its own gravity.

Further, the lid G or $G^2$ for opening and closing the way $D^3$ of a chute D may be dispensed with; but it is preferable to use it and to arrange it as particularly described, and shown in Figs. 1, 2, 3, and 4. These lids, again, may be constructed in sections K K², Fig. 7, to slide in ways of the hopper to and fro across its ways or passages $D^3$, and to be automatically closed and held closed by a spring $K^4$. The sliding cover-sections K K² may be opened by hand or by the barrel as it is forced into the chute and works against the wedge-blocks $K^5$ $K^5$ of the sections.

The side wings E E² E³ and the lids F F² constitute the means for closing the throats or openings C C² of the receptacle A, and, as particularly described, each integrally is rigid; but each and all, however, may be flexible and made of canvas, suitably attached to each other and to the chute and the top of the receptacle at the sides of its throat or opening, so as to fold as the chute is moved from its normal or vertical to its horizontal position, and to open out as the chute is returned to its normal position. Again, either the sides or the lids, or both, may be made in sections overlapping each other and adapted to slide, within given limits, on each other as the chute is moved from one position to another. Such a construction is shown, Figs. 7 and 8, $a$ $a$ $a$ being the overlapping sections, joined by slot $b$ and pin $d$, and otherwise arranged, as is obviously and plainly shown in the drawings. Further, the sides and lids for closing the throats of the receptacles, as has been described, may be severally rigid and rigidly joined and arranged, as the chute is swung to pass through the top downward into and upward out of the receptacle, and preferably in a case of suitable shape therefor. This construction is shown in Fig. 9, L being the casing.

All constructions and arrangements herein described of the sides E E² E³ and lids F F² constitute in each instance the means for closing the throats of the receptacle and keeping them closed in all positions of the chutes or hoppers, and they are obviously the hoods of the apparatus of this invention.

Having thus described my invention, what I claim, and desire to secure by Letters Patent, is—

1. An apparatus for dumping barrels, &c., composed of a hopper or chute having a way or passage to receive the barrel, &c., to be dumped, a support for the hopper having an opening or throat therethrough, means for connecting the hopper to and applied at one side of said opening of the support, and whereby the hopper can be moved from a position at one side of to a position over said opening and vice versa, in combination with a hood which is held on said support and at all times surrounds and envelops its said opening and the way or passage of the hopper, and is adapted to permit of said movements of the hopper, substantially as described, for the purpose specified.

2. An apparatus for dumping barrels, &c., composed of a hopper or chute having a way or passage to receive the barrel, &c., to be dumped, a support for the hopper having an opening or throat therethrough, means for connecting the hopper to and applied at one side of said opening of the support, and whereby the hopper can be moved from a position at one side of to a position over said opening and vice versa, in combination with a hood, which is held on said support and at all times surrounds and envelops its said opening and the way or passage of the hopper and is adapted to permit of said movements of the hopper, and a cover or lid held on the hopper for closing its passage or way, substantially as described, for the purpose specified.

3. An apparatus for dumping barrels, &c., composed of a hopper or chute having a way or passage to receive the barrel, &c., to be dumped, a support for the hopper having an opening or throat therethrough, means for connecting the hopper to and applied at one side of said opening of the support, and whereby the hopper can be moved from a position at one side of to a position over said opening and vice versa, in combination with a hood which is held on said support and is constructed of stationary wings located at opposite sides of the opening of the support and hopper, and of a lid located between said side wings and at its lower end portion swinging on the support and at its upper end portion free to rest against the hopper in its position at one side of the opening of the support, substantially as described, for the purpose specified.

4. An apparatus for dumping barrels, &c., composed of a hopper or chute having a way or passage to receive the barrel, &c., to be dumped, a support for the hopper having an opening or throat therethrough, means for connecting the hopper to and applied at one side of said opening of the support, and whereby the hopper can be moved from a position at one side of to a position over said opening and vice versa, in combination with a hood, which is held on said support and is constructed of stationary wings located at opposite sides of the opening of the support and hopper, and of a lid located between said side wings and at its lower end portion swinging on the support and at its upper end portion free to rest against the hopper in position at one side of the opening of the support, and a lid at its upper end portion held on and swinging on the hopper-support and with the hopper in position at one side of the opening of the support depending and covering the way or passage of the hopper, substantially as described, for the purpose specified.

In testimony whereof I have hereunto set my hand in the presence of two subscribing witnesses.

JOHN E. CURRY.

Witnesses:
ALBERT W. BROWN,
H. F. MCKEEVER.